July 17, 1928.
H. M. VICKERY
BUMPER
1,677,506
Original Filed July 18, 1925  2 Sheets-Sheet 1
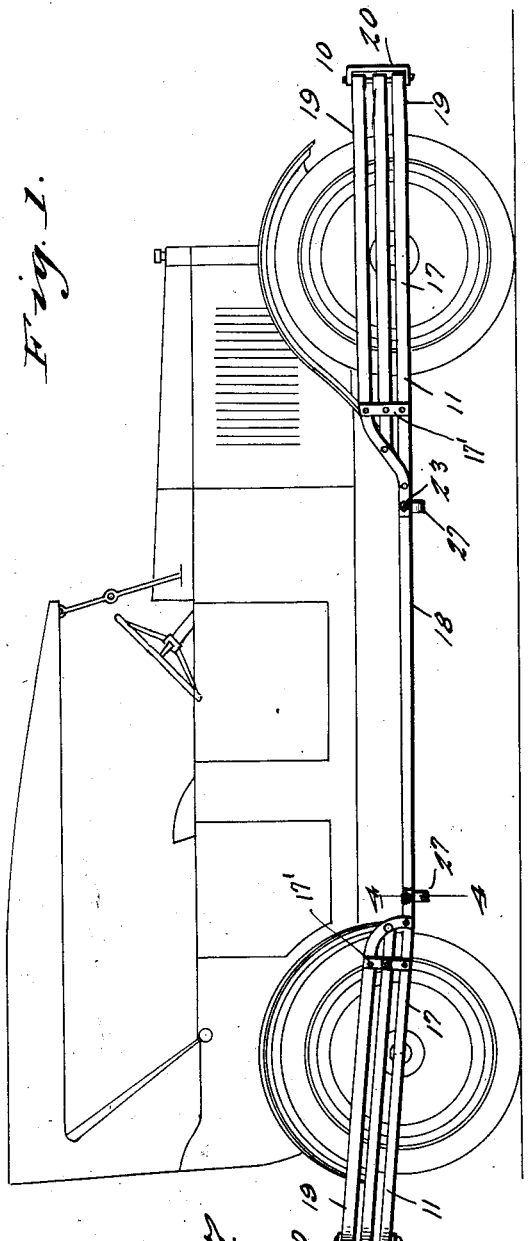
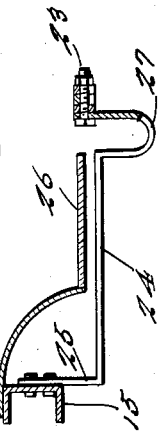
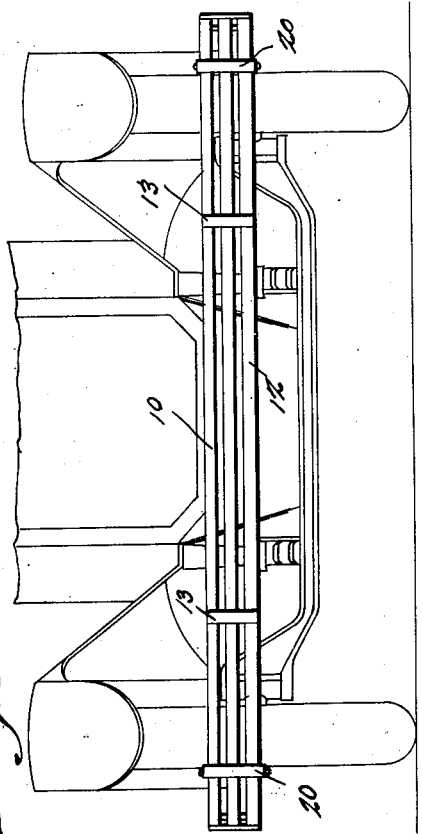
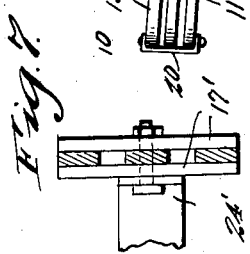

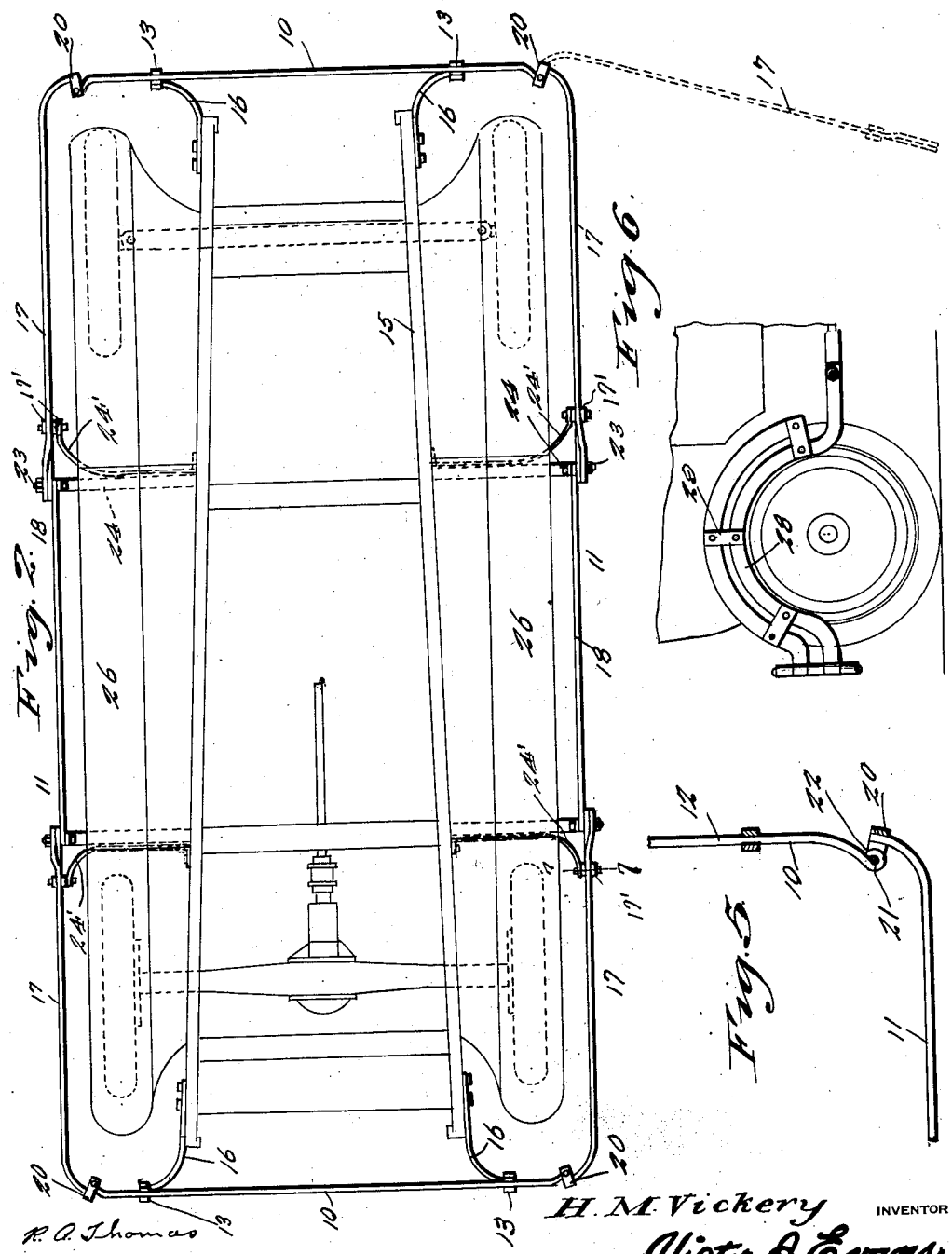

Patented July 17, 1928.

1,677,506

UNITED STATES PATENT OFFICE.

HENRY M. VICKERY, OF OAKLAND, CALIFORNIA.

BUMPER.

Application filed July 18, 1925, Serial No. 44,556. Renewed December 16, 1927.

This invention relates to improvements in bumpers especially designed for use upon motor vehicles.

An object of the present invention is to provide protective means which extend entirely around the vehicle and which are supported entirely by the vehicle frame, so that shocks or jars due to contact of the bumper will be resisted by the frame.

Another object of the invention is the provision of a bumper for this purpose which is novel in construction, may be easily applied and which in addition may be sectionally opened or removed when necessary, without removing the entire bumper.

With the above and other objects in view, the invention further includes the following novel features and details of construction, to be hereinafter more fully described, illustrated in the accompanying drawings and pointed out in the appended claims.

In the drawings:—

Figure 1 is a side elevation of an automobile equipped with a bumper constituting the present invention.

Figure 2 is a bottom plan view with parts of the automobile broken away or removed.

Figure 3 is a fragmentary front elevation.

Figure 4 is an enlarged fragmentary section on the line 4—4 of Figure 1.

Figure 5 is an enlarged plan view partly in section illustrating the hinged connection between the end and side bumpers.

Figure 6 is a fragmentary side elevation showing a different form of side bumper.

Figure 7 is an enlarged fragmentary sectional view taken substantially on the line 7—7 of Figure 2.

Referring to the drawings in detail wherein like characters of reference denote corresponding parts, the invention as shown comprises front and rear end bumpers 10 and side bumpers 11, the said bumpers being connected so as to provide a substantially continuous bumper which extends entirely around the vehicle.

The front and rear bumpers 10 are of similar construction and may include any number of spaced parallel bars 12 which are suitably connected as at 13 and which are supported from the opposite ends of the frame 15 of the vehicle, by means of arms 16.

The side bumpers 11 are also of like construction and each includes front and rear side sections 17 which are connected by intermediate sections 18.

The front and rear side sections 17 are preferably formed of a number of spaced parallel bars 19 which conform in number to the number of bars of the bumpers 10. These bars 18 have their outer ends hingedly connected to the bumpers 10 and for this purpose carry straps 20 within which are secured pivot pins 21, the latter passing through eyes 22 at the opposite ends of the bars 12 of the front and rear bumpers.

The intermediate sections 18 of the side bumpers are detachably connected to the inner ends of the front sections 17 by means of bolts 23 and the latter also serve to connect the outer ends of laterally extending horizontally disposed arms 24, the inner ends of these arms being bent substantially at right angles as at 25 and attached to the opposite side bars of the frame 15. The arms 24 extend beneath the running boards 26 of the vehicle and at the outer edges of these running boards the arms are preferably formed with spring loops 27.

In addition to the arms 24, arms 24' may be provided, the last mentioned arms extending from the frame 15 to the inner ends of the front and rear sections of the bumper to which they are secured by the fastening devices which serve to hold the spacing bars 17' in place. It is obvious that various other means may be provided for attaching the bumper to the machine, the means varying with the particular type of machine and size of the bumper and it is not the purpose of the present invention to restrict the application in this particular.

If desired, the front and rear side sections of the side bumpers may be shaped to conform to the shape of the mud guards of the vehicle as indicated at 28 in Figure 6 of the drawings, the straps 29 which connect the bars of these sections being secured to the mud guards. Bumpers of this character in addition to serving as a protection against impact will also assist in maintaining the guards in a rigid condition.

The invention is susceptible of various changes in its form, proportions and minor details of construction and the right is herein reserved to make such changes as properly fall within the scope of the appended claims.

Having described the invention what is claimed is:—

1. In combination with a motor vehicle, front and rear bumpers secured to and extending across the front and rear ends of the vehicle, side bumpers extending along the entire opposite sides of the vehicle, means connecting the opposite ends of the side bumpers to the front and rear bumpers and means secured to and extending laterally from the frame of the vehicle to support the intermediate portions of the side bumpers.

2. In combination with a motor vehicle, front and rear bumpers secured to and extending across the front and rear ends of the vehicle, side bumpers extending along the entire opposite sides of the vehicle, means connecting the opposite ends of the side bumpers to the front and rear bumpers and arms secured to and extending laterally from the frame of the vehicle to support the intermediate portions of the side bumpers.

3. In combination with a motor vehicle, front and rear bumpers secured to and extending across the front and rear ends of the vehicle, side bumpers extending along the opposite sides of the vehicle, means connecting the opposite ends of the side bumpers to the front and rear bumpers and arms secured to and extending laterally from the frame of the vehicle to support the intermediate portions of the side bumpers and vertically disposed spring loops included in said arms.

4. In combination with a motor vehicle, front and rear bumpers secured to and extending across the front and rear ends of the vehicle, side bumpers extending along the opposite sides of the vehicle, said side bumpers each including front and rear side sections and intermediate sections detachably connected to the front and rear side sections, means hingedly connecting the front and rear side sections to the front and rear bumpers and means secured to and extending laterally from the frame of the vehicle to support the intermediate portions of the side bumpers.

5. In combination with a motor vehicle, front and rear bumpers secured to and extending across the front and rear ends of the vehicle, side bumpers extending along the opposite sides of the vehicle, said side bumpers each including front and rear side sections shaped to conform to the shape of the mud guards of the vehicle, means connecting said sections and mud guards and intermediate sections detachably connected to the front and rear side sections, means hingedly connecting the front and rear side sections to the front and rear bumpers and means secured to and extending laterally from the frame of the vehicle to support the intermediate portions of the side bumpers.

In testimony whereof I affix my signature.

HENRY M. VICKERY.